(12) United States Patent
Maeda

(10) Patent No.: US 6,756,427 B2
(45) Date of Patent: Jun. 29, 2004

(54) PROCESS FOR PRODUCING THERMOPLASTIC RESIN COMPOSITION

(75) Inventor: Mituo Maeda, Tsukuba (JP)

(73) Assignee: Sumitomo Chemical Company Limited, Osaka (JP)

( * ) Notice: Subject to any disclaimer, the term of this patent is extended or adjusted under 35 U.S.C. 154(b) by 163 days.

(21) Appl. No.: 09/842,902

(22) Filed: Apr. 27, 2001

(65) Prior Publication Data

US 2002/0028859 A1 Mar. 7, 2002

(30) Foreign Application Priority Data

Apr. 28, 2000 (JP) ........................................ 2000-130347

(51) Int. Cl.$^7$ ............................... C08J 9/32; C08J 3/20; C08J 3/22
(52) U.S. Cl. ........................ 523/219; 523/218; 523/348; 523/351; 523/353
(58) Field of Search ................................ 523/219, 218, 523/348, 351, 353

(56) References Cited

U.S. PATENT DOCUMENTS

| | | | |
|---|---|---|---|
| 5,308,892 A | * | 5/1994 | Zickler et al. |
| 5,348,990 A | * | 9/1994 | Walpita et al. |
| 5,541,240 A | * | 7/1996 | Makhija et al. |

* cited by examiner

Primary Examiner—Tae H. Yoon
(74) Attorney, Agent, or Firm—Birch, Stewart, Kolasch & Birch, LLP

(57) ABSTRACT

Provided is a process for producing a thermoplastic resin composition of low specific gravity containing hollow spheres by a melt processing extrusion method, wherein a melt-kneading extruder equipped with a screw is used and the extruder has an upper stream side supplying portion at the upper stream part of the extrusion direction, and a lower stream side supplying portion at the lower stream part from said upper stream side supplying portion, and the ratio (L/D) of the distance (L) between said upper stream side supplying portion and said lower stream side supplying portion to the diameter (D) of a screw is 4–30 (L and D are the same scale units); and under screw rotation, a thermoplastic resin having a specific gravity of 1.10 or more is supplied from the upper stream side supplying portion, and hollow spheres in an amount of 2–50 parts by weight based on 100 parts by weight of the thermoplastic resin are supplied from the lower stream side supplying portion.

7 Claims, 1 Drawing Sheet

PROCESS FOR PRODUCING THERMOPLASTIC RESIN COMPOSITION

BACKGROUND OF THE INVENTION

1. Field of the Invention

The present invention relates to a process for producing a thermoplastic resin composition.

2. Description of the Related Art

A thermoplastic resin, especially a high heat-resistant thermoplastic resin called engineering resin is broadly used as a molding material for various products and parts, such as machine parts, household electric appliances, communication apparatuses, OA parts, automobile parts, and leisure goods. In recent years, for the products and parts, downsizing, lightening and performance-elevating are more and more required. Following this, more light-weighted thermoplastic resins have been required as the materials with maintaining their properties as much as possible.

As a means for weight-lightening of a thermoplastic resin, i.e., lowering of specific gravity, methods of compounding hollow spheres have been known. Thermoplastic resin compositions compounded hollow spheres are described in JP-A 53-121851, JP-A 58-93759, JP-A 64-74258, etc. These compositions are usually manufactured with pelletizing by melt processing extrusion.

However, by the usual melt processing extrusion method, hollow spheres may be fractured in a considerable rate due to shear forces by melt-kneading. Thus, it has been difficult to obtain a composition of low specific gravity.

The object of the present invention is to solve the above-mentioned problem and to provide a process for producing a thermoplastic resin composition of low specific gravity containing hollow spheres by a melt processing extrusion method.

SUMMARY OF THE INVENTION

As a result of extensive studies, the present inventors have found that the above problems are solved by supplying a thermoplastic resin and hollow spheres to the extruder in a specific ratio, with using a specific melt processing extruder, thus completed the present invention.

Namely, the present invention relates to a process for producing a thermoplastic resin composition, wherein a melt-kneading extruder equipped with a screw is used and the extruder has an upper stream side supplying portion at the upper stream part of the extrusion direction, and a lower stream side supplying portion at the lower stream part from said upper stream side supplying portion, and the ratio (L/D) of the distance (L) between said upper stream side supplying portion and said lower stream side supplying portion to the diameter (D) of a screw is 4–30 (L and D are the same scale units); and under screw rotation, a thermoplastic resin having a specific gravity of 1.10 or more is supplied from the upper stream side supplying portion, and hollow spheres in an amount of 2–50 parts by weight based on 100 parts by weight of the thermoplastic resin are supplied from the lower stream side supplying portion.

Figure 1:
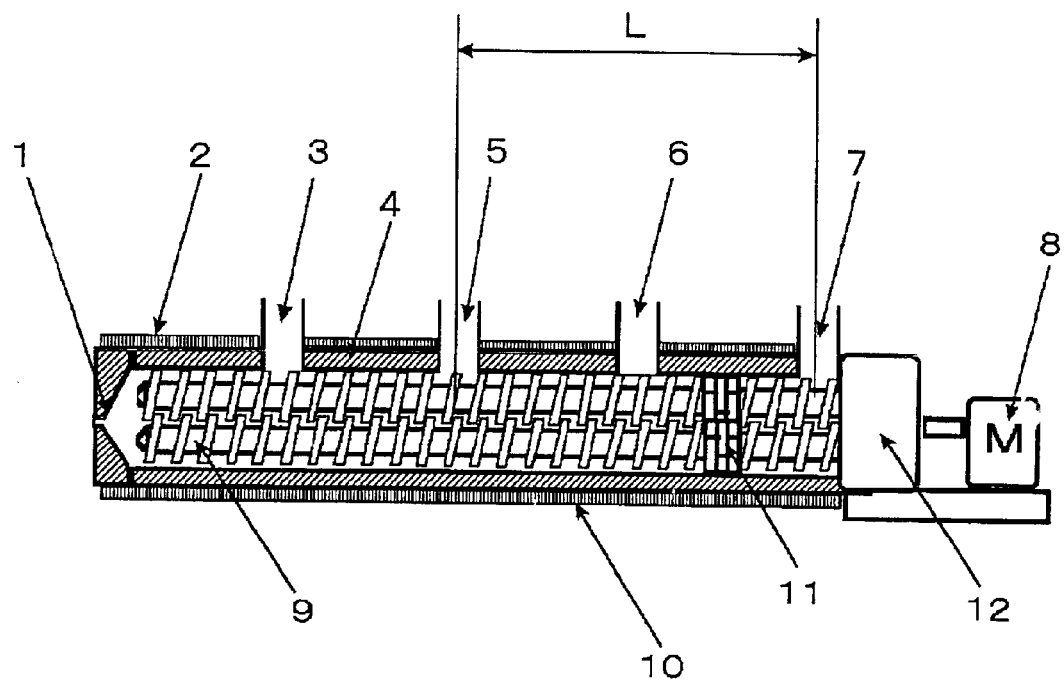
FIG. 1 is a cross sectional view of a melt kneading extruder. The denotation used in the figure are as follows.

1: Nozzle
2: Heater
3: Vent
4: Cylinder
5: Lower stream side supplying portion
6: Vent
7: Upper stream side supplying portion
8: Motor
9: Screw (screw diameter, D)
10: Heater
11: Kneading section
12: Change gear
L: Distance between upper stream side supplying portion and lower stream side supplying portion

DETAILED DESCRIPTION OF THE INVENTION

The specific gravity of the thermoplastic resin used by the present invention is 1.10 or more, and suitably, the specific gravity is 1.30 or more. When the specific gravity is less than 1.10, although it is possible to formulate hollow spheres in order to lower the specific gravity, much amount of compounding hollow spheres are usually required. And since the breakdown of spheres by shearing at the time of manufacture tends to occur, it is not suitable.

Examples of the thermoplastic resins include a liquid crystal polyester resin, a polybutyleneterephthalate resin, a polyethyleneterephthalate resin, a polyphenylene sulfide resin, a polyetheretherketone resin, a polycarbonate resin, a polysulfone resin, a polyethersulfone resin, a polyetherimide resin, etc., and two or more of them can be used according to requirements. Among them, a liquid crystal polyester resin is suitable, since the viscosity at the time of molten is low, and shearing to hollow spheres can be made small essentially. A liquid crystal polyester resin having a flow temperature of 250° C. or more is more suitable. Here, the flow temperature means a temperature at which the melt viscosity shows 48000 poise when a heated resin is extruded, using a capillary tube rheometer, through a nozzle having an inner diameter of 1 mm and a length of 10 mm under a load of 9.81 MPa at a temperature-rising rate of 4° C./minute.

The liquid crystal polyester used in the present invention is a polyester called thermotropic liquid crystal polymer. Examples thereof include:

(1) one comprising a combination of an aromatic dicarboxylic acid, an aromatic diol, and an aromatic hydroxycarboxylic acid;
(2) one comprising different kinds of aromatic hydroxycarboxylic acids;
(3) one comprising a combination of an aromatic dicarboxylic acid and an aromatic diol; and
(4) one in which aromatic hydroxycarboxylic acid is reacted with a polyester, such as polyethylene terephthalate.

Those are form anisotropic melt at a temperature of 400° C. or less. As the synthetic raw materials, ester forming derivatives thereof may be used instead of such aromatic dicarboxylic acid, aromatic diol, and aromatic hydroxycarboxylic acid.

Examples of ester forming derivatives of carboxylic acid include: derivatives in which carboxyl group is converted into a group such as acid chloride and acid anhydride which is highly reactive to promote a reaction of producing a polyester; and derivatives in which the carboxyl group is a ester with alcohols and ethylene glycols, which can produce a polyester by trans-esterification. Moreover, examples of ester forming derivatives of hydroxy group include derivatives in which the hydroxy group is a ester with carboxylic acids, which can produce a polyester by trans-esterification.

The aromatic dicarboxylic acid, aromatic diol, and aromatic hydroxycarboxylic acid may have one or more substituents of a halogen atom, methyl group, ethyl group, and aryl group, as far as the substituents do not inhibit ester forming property.

As the repeating units of the liquid crystal polyester, followings can be illustrated without being limited to these.

Repeating unit derived from aromatic hydroxycarboxylic acid:

Formula 2

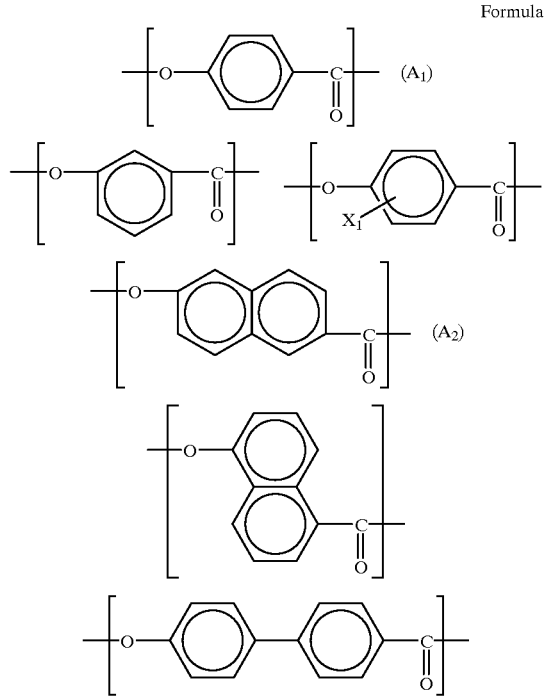

In the formula, x1 shows a halogen atom or an alkyl group.

Repeating unit derived from aromatic dicarboxylic acid:

Formula 3

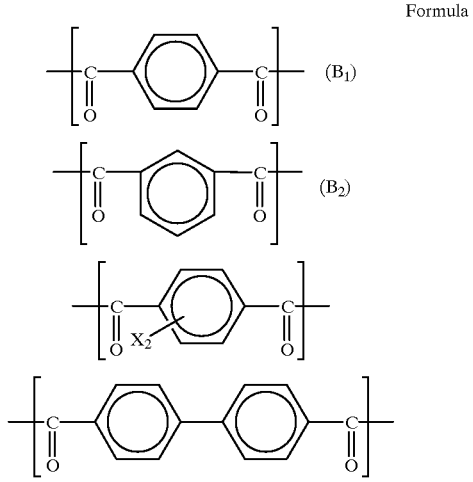

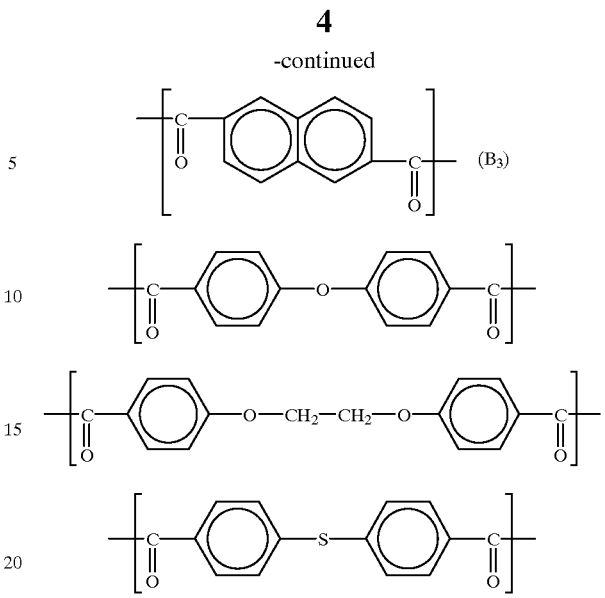

In the formula, x2 shows a halogen atom, an alkyl group or an aryl group.

Repeating unit derived from aromatic diol:

Formula 4

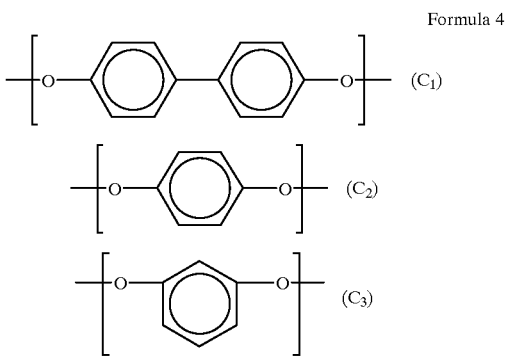

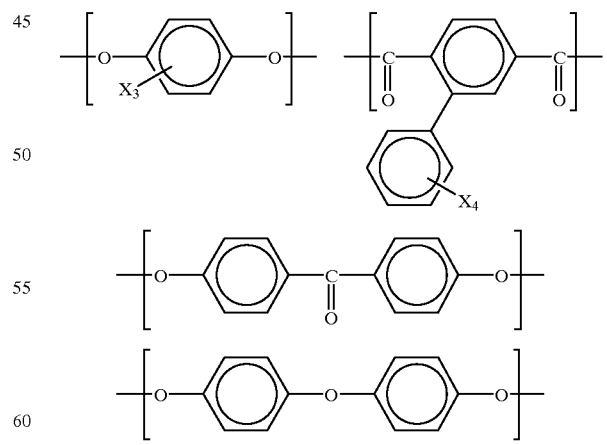

In the formula, x3 shows a halogen atom, an alkyl group, or an aryl group, and x4 shows a hydrogen atom, a halogen atom, or an alkyl group.

Formula 5

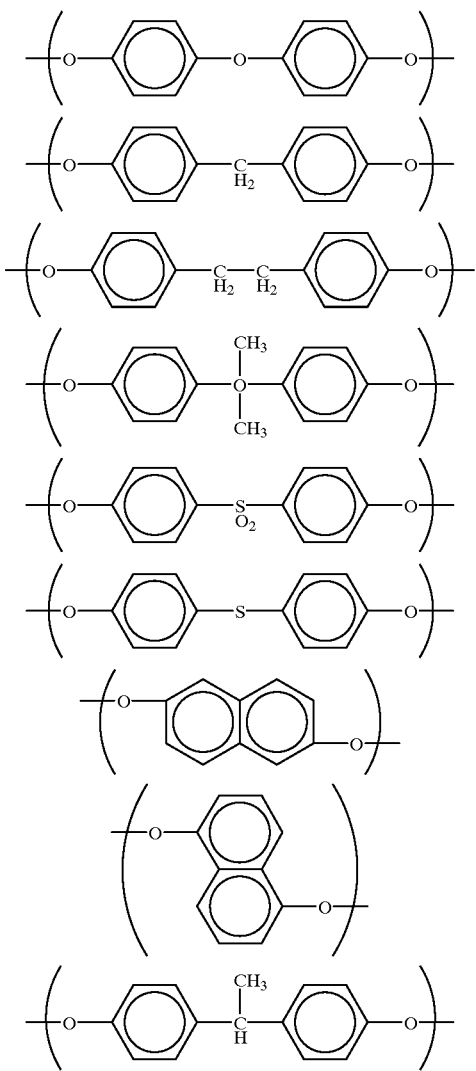

Liquid crystal polyesters especially preferable from the balance of heat resistance, mechanical properties, and processability are those in which the repeating unit represented by $A_1$ of the above formula is contained at least 30% by mole.

Concretely, those having a suitable combination of repeating units as shown below (a)–(f).

(a): $(A_1)$, $(B_1)$ or a mixture of $(B_1)$ and $(B_2)$, and $(C_1)$
(b): $(A_1)$, and $(A_2)$
(c): in the structural units of the combination (a), a part of $(A_1)$ is replaced by $(A_2)$
(d): in the structural units of the combination (a), a part of $(B_1)$ is replaced by $(B_3)$
(e): in the structural units of the combination (a), a part of $(C_1)$ is replaced by $(C_3)$
(f): to the structural units of the combination (b), structural units of $(B_1)$ and $(C_2)$ are added.

As the manufacture method of the liquid crystal polyester resin, a well-known method is employable. About the liquid crystal polyester (a) and (b) used as fundamental structure, methods described in JP-B 47-47870 and JP-B 63-3888 etc. are exemplified, respectively.

The hollow spheres used in the present invention are those generally called "balloon". As the materials of hollow spheres, exemplified are: inorganic materials such as alumina, silica, and glass, etc.; and organic materials such as a urea resin and a phenol resin, etc.; and a mixture of two or more thereof can be used according to requirements. Among them, glass is suitable in view of heat resistance and mechanical strength. Namely, glass balloon is used suitably as hollow spheres.

In view of lowering specific gravity, the amount of hollow spheres based on 100 parts by weight of a liquid crystal polyester resin is 2 parts by weight or more, suitably 5 parts by weight or more, and more suitably 10 parts by weight or more. In view of suppressing breakdown of hollow spheres, the amount of hollow spheres is 50 parts by weight or less, and 30 parts by weight or less.

The mean particle diameter of hollow spheres is suitably 5 $\mu$m or more, more suitably 10 $\mu$m or more, in view of moldability. In view of breakdown suppression of hollow spheres, and moldability, it is suitably 500 $\mu$m or less, and more suitably 200 $\mu$m or less. Here, the mean particle diameter is measured by a particle size distribution measurement apparatus.

Moreover, as for the volume hollowness of hollow spheres, it is suitably 60% or more in view of specific gravity lowering. In view of breakdown suppression of hollow spheres, it is suitably 80% or less.

Volume hollowness of hollow spheres can be obtained by the following formula.

$$\text{Volume hollowness } (\%) = 100 \times (1 - \rho_1/\rho_2)$$

In the formula, $\rho_1$ represents the true specific gravity of hollow spheres. $\rho_2$ represents the material specific gravity of hollow spheres.

Moreover, a filler can be added to the thermoplastic resin used in the present invention within a range which does not injure the purpose of the present invention.

As a filler, exemplified are: fibrous- or needle-shaped reinforcements, such as glass fiber, wolastnite, carbon fiber, potassium titanate whisker, aluminum borate whisker, and titanium oxide whisker; and inorganic fillers, such as calcium carbonate, dolomite, talc, mica, clay, and glass beads, etc. These can be used alone or in combination of two or more.

Among them, in view of improvement of strength, it is suitable to compound inorganic fibers, such as glass fiber. The amount of compounding in this case based on 100 parts by weight of liquid crystal polyester resins is suitably 1 part by weight to 40 parts by weight, more suitably 3 parts by weight to 30 parts by weight, and further suitably 5 to 30 parts by weight.

To the thermoplastic resin used in the present invention, usual additives, such as colorants like dye and pigment; antioxidant; heat stabilizer; ultraviolet absorber; antistatic agent; and surfactant, can be added alone or in combination of two or more, within a range which does not injure the purpose the present invention.

Moreover, in the present invention, in addition to the thermoplastic resin, a small amount of other thermoplastic resins, usually 30 parts by weight or less based on 100 parts by weight of the thermoplastic resin, for example, polyamide, polyester, polyphenylene sulfide, polyether ketone, polycarbonate, polyphenylene ether and modifications thereof, polysulfone, polyethersulfone, polyetherimide, etc., can be added.

A small amount of thermosetting resins, usually 30 parts by weight or less based on 100 parts by weight of the thermoplastic resin, for example, such as a phenol resin, an epoxy resin, and a polyimide resin can be added as well, and these can be used alone or in combination of two or more.

The process for producing of the present invention is characterized in that a melt-kneading extruder equipped with a screw is used and the extruder has an upper stream side supplying portion at the upper stream part of the extrusion direction, and a lower stream side supplying portion at the lower stream part from said upper stream side supplying portion, and the ratio (L/D) of the distance (L) between said upper stream side supplying portion and said lower stream side supplying portion to the diameter (D) of a screw is 4–30 (L and D are the same scale units); and under screw rotation, a thermoplastic resin having a specific gravity of 1.10 or more is supplied from the upper stream side supplying portion, and hollow spheres in an amount of 2–50 parts by weight based on 100 parts by weight of the thermoplastic resin are supplied from the lower stream side supplying portion.

The ratio (L/D) of the distance (L) between the upper stream side supplying portion and the lower stream side supplying portion to the diameter (D) of a screw is 4–30 (L and D are the same scale units), and suitably 10–20. When L/D is smaller than 4, breakdown of the hollow spheres will increase, and when it is larger than 30, deterioration of a thermoplastic resin will tend to progress.

Here, the distance between the upper stream side supplying portion and the lower stream side supplying portion (L) is a distance parallel to the axis of a screw which measured between the centers of the holes of each supplying portions.

In the present invention, although the upper stream side supplying portion is usually installed at the end side of the cylinder reverse to extrusion direction, it is not limited to this.

In addition, a filler, additives, etc. can be supplied in an extruder from the supplying mouth installed at the suitable position of the extruder, or from the upper and/or lower stream side supplying portions as well. Or they are mixed beforehand together with the thermoplastic resin and/or glass fiber and can be supplied from the upper stream side supplying portion or the lower stream side supplying portion.

In view of simple and easy procedure, it is suitable to supply from the upper and/or lower stream side supplying portion. In view of breakdown suppression of hollow spheres, it is more suitable to supply from the upper stream side supplying portion.

In supplying from the upper stream side supplying portion and/or the lower stream side supplying portion it is still suitable to mix a filler, additives, etc. with a thermoplastic resin and/or hollow spheres beforehand, and to supply in an extruder with these from the upper stream side supplying portion and/or the lower stream side supplying portion.

As a melt kneading extruder, a single screw extruder and a twin-screw extruder are exemplified. As a twin-screw extruder, a same-direction rotation type, a reverse-direction rotation type, and an imperfect-engagement type are exemplified. Suitably used is a same-direction rotation type twin-screw extruder. Examples of the same-direction rotation type include a single-thread screw type, a double-thread screw type, and a triple-thread screw type. Examples of the reverse-direction rotation type include a parallel axis type and an inclined axis type.

In the melt-kneading extruder suitably used for the present invention, the screw portion at lower stream from the lower stream side supplying portion of a melt-kneading extruder substantially consists of only a thread screw of forward direction to the extrusion direction, and does not have kneading section. Thereby, kneading of hollow spheres becomes weak and can suppress the breakdown thereof. Here, the thread screw of forward direction to the extrusion direction is a thread screw which conveys a thermoplastic resin etc. to the extrusion direction by screw rotation. For example, full flighted screw is exemplified.

The kneading section means the portion prepared in a part of the screw for kneading efficiently.

As kneading section, in case of a single screw extruder, a Dulmage screw, a uni-melt screw, a pin screw, a barrier screw, etc. are exemplified.

On the other hand, in case of a twin-screw extruder, kneading discs (right kneading disc, neutral kneading disc, left kneading disc), a mixing screw, etc. are exemplified.

Hereinafter, an embodiment of the manufacture method of the present invention is explained with reference to the drawing.

FIG. 1 is a structural view showing an embodiment of the melt kneading extruder (twin-screw) concerning the present invention.

In cylinder 4 installed in an extruder, screw 9 are rotated by (driving) motor 8 with changing the rotation speed slowing down by change-gear 12. Cylinder 4 is heated by (outside) heater 10.

Screw 9 has a kneading section 11 for kneading a thermoplastic resin, or for kneading hollow spheres and a thermoplastic resin.

In this embodiment, screw 9 does not have a kneading section at the lower stream side from the lower stream side supplying portion.

At the end side reverse to extrusion direction of cylinder 4, upper stream side supplying portion 7 for supplying a thermoplastic resin is formed. At the lower stream side of the upper stream side supplying portion 7, lower stream side supplying portion 5 for supplying hollow spheres is formed. To the upper stream side supplying portion 7 and the lower stream side supplying portion 5, a constant delivery feeder (not illustrated) is installed in order to supply quantitatively a thermoplastic resin, hollow spheres, etc.

Moreover, in order to conduct vacuum degassing using a vacuum pump, vents 3 and 6 are formed in the cylinder 4 for releasing into atmosphere. In cylinder 4, nozzle 1 is formed for extruding the melt-kneaded thermoplastic resin composition. Depending also on the size of the extruder, generally it has some holes having a diameter of 2 mm to 5 mm.

In the process of the present invention, as described above, usually a thermoplastic resin is supplied from the upper stream side supplying portion, and hollow spheres are supplied from the lower stream side supplying portion. But it is also possible that a part of thermoplastic resin is supplied from the lower stream side supplying portion, and/or a part of hollow spheres is supplied from the upper stream side supplying portion, according to requirements. However, when the supplying amount of hollow spheres from the upper stream side supplying portion exceeds 10% of the total supplying amount of the hollow sphere, the breakdown rate of the hollow spheres may become large. When the supplying amount of the liquid crystal polyester resin from the upper stream side supplying portion is less than 90% of the total supplying amount of the liquid crystal polyester resin, stable manufacturing process may be sometimes difficult.

Moreover, when a filler etc. is added in addition to hollow spheres, in view of the breakdown suppression of hollow spheres, it is suitable to supply the filler from the upper stream side supplying portion.

The thermoplastic resin composition manufactured by the manufacture method of the present invention, has a low breakdown rate of hollow spheres, low specific gravity and low thermal conductivity, in addition to the mechanical, and thermal (heat resistance) properties which the thermoplastic resin originally has. The thermoplastic resin composition can be used as various molded articles by molding methods, such as injection molding.

When conducting injection molding, in order to suppress the breakdown of hollow spheres, the injection pressure and the holding pressure of molding machine, are desirable to set as low as possible in a range which does not affect a molded article.

The use of parts or material members molded from the resin composition of the present invention is not especially limited. Examples of them include: electric and electronic parts such as a connector, a socket, relay parts, a coil bobbin, optical pickup, an oscillator, a printed wiring board, and computer related parts; semiconductor related parts such as IC tray and a wafer carrier; home electric appliances such as VTR, television, an iron, an air-conditioner, a stereo, a cleaner, a refrigerator, a rice cooker, and illumination instruments; illumination instruments parts such as a lamp reflector and a lamp holder; acoustic goods such as a compact disc a laser disc, and a speaker; communication apparatuses such as a ferrule for optical cables, telephone parts, facsimile parts and a modem; copying machine related parts such as a stripping finger and a heater holder; machine parts such as an impeller, a fan gear, a gear, a bearing, motor parts, and a case; automobile parts, such as a mechanical component for cars, engine parts, parts in engine room, parts for electronics, and interior parts; cooking appliances such as a pan for microwave cooking and heat-resistant tableware; heat-insulation material or sound-insulation material such as a floor material and a wall material;
supporting material such as a beam, and a pillar; building materials and/or construction materials such as a roof material; airplane, space machine, and parts for space machinery; parts for radiation facility, such as a nuclear reactor, parts for marine facility, jigs for cleaning, optical instrument parts, bulbs, pipes, nozzles, filters, films, medical application instrument parts and medical application material, sensors parts, sanitary goods, sports goods, leisure goods, etc.

EXAMPLES

Hereinafter, examples of the present invention are described but the present invention is not limited to these. Physical properties of the examples were measured by the following method.
(1) Flow temperature: A temperature was measured at which the melt viscosity shows 48000 poise when a heated resin is extruded through a nozzle having an inner diameter of 1 mm and a length of 10 mm under a load of 9.81 MPa at a temperature-rising rate of 4° C./minute using a Koka type Flow Tester CFT-500 produced by Shimadzu Corporation.
(2) Specific gravity: It was measured according to ASTM D792 (23° C.) with using ASTM No. 4 dumbbell (thickness of 2.5 mm). Equivalent results were obtained by using a test piece of 64×64×15 mm thickness or a test piece having a length of 127 mm, a width of 12.7 mm and a thickness 6.4 mm.
(3) Breakdown rate: Calculated by following formula.

$$\text{Breakdown Rate } X (\%) = 100 \times [(100/\rho_0 + \alpha/\rho_1 + \beta/\rho_3) - (100 + \alpha + \beta)/\rho]/(\alpha/\rho_1 - \alpha/\rho_2)$$

[in the formula, α is the formulating amount of glass balloon (parts by weight based on 100 parts by weight of the liquid crystal polyester resin), is the formulating amount of glass fiber (parts by weight based on 100 parts by weight of the liquid crystal polyester resin), $\beta_0$ is the specific gravity of liquid crystal polyester resin, $\rho_1$ is the true specific gravity of glass balloon, $\rho_2$ is the material specific gravity of glass balloon, $\rho_3$ is the specific gravity of glass fiber, and $\rho$ is the specific gravity of ASTM No.4 dumbbell (2.5 mm in thickness) obtained by injection molding of a liquid crystal polyester resin composition].
(4) Heat conductivity: Measured using a test piece of 64×64×15 mm thickness, according to JIS R2618.
(5) Bending strength: Measured according to ASTM D790 with using a test piece having a length of 127 mm, a width of 12.7 mm, and a thickness of 6.4 mm.

Examples 1–2, Comparative Example 1

Each following components of a liquid crystal polyester resin shown below, glass balloon, and glass fiber in a composition shown in Table 1, was pelletized at a cylinder temperature of 400° C., with using a twin-screw kneading extruder (PMT47 produced by IKG Corporation.), and pellets of the liquid crystal polyester resin composition were obtained.

In the twin-screw extruder, supplying positions were set in two places, as an upper stream part and a lower stream part.

The supplying positions for each components and the ratio (L/D) of the distance (R) of upper stream part and lower stream part and the diameter (D) of a screw are shown in Table 1.

Thread screw was used at a lower stream side from the lower stream side supplying portion.

Moreover, from the upper stream side supplying portion to the lower stream side supplying portion, kneading discs (right kneading disc, neutral kneading disc, left kneading disc) were used combining with a thread screw.

Liquid crystal polyester resin: It consists of the above structural units ($A_1$), ($B_1$), ($B_2$), and ($C_1$), in a molar ratio of ($A_1$):($B_1$):($B_2$):($C_1$) is 50:23.75:1.25:25, and the above-mentioned flow temperature of the liquid crystal polyester resin is 380° C. [specific gravity 1.38].

Glass balloon : Glass balloon having a mean particle diameter of 30 μm [produced by Sumitomo 3M Limited, 76% of volume hollowness, trade name :Scotch light S60, true specific gravity 0.60, material specific gravity 2.50].

Glass fiber : Chopped fiber [produced by Asahi fiber glass, trade name: CS03JAPX-1, specific gravity 2.54].

Resultant pellets were injection-molded using an injection molding machine produced by Nissei Plastic Industrial, PS40E5ASE type, at a mold temperature of 130° C., a cylinder temperature of 400° C., and the above test pieces were obtained and the above measurement were conducted. The result is shown in Table 1.

TABLE 1

|  |  | Example 1 | Example 2 | Comparative Example 1 |
|---|---|---|---|---|
| Composition (parts) | Liquid crystal polyester | 100 | 100 | 100 |
|  | Glass balloon | 18.8 | 18.8 | 18.8 |

TABLE 1-continued

|  |  | Example 1 | Example 2 | Comparative Example 1 |
|---|---|---|---|---|
| Supplying position | Glass fiber | 6.3 | 6.3 | 6.3 |
|  | Liquid crystal polyester | upper stream side | upper stream side | upper stream side |
|  | Glass balloon | lower stream side | lower stream side | upper stream side |
|  | Glass fiber | upper stream side | lower stream side | upper stream side |
| L/D | L/D | 14 | 14 | — |
| Evaluation | Specific gravity | 1.21 | 1.24 | 1.35 |
|  | Breakdown rate (%) | 12.1 | 22.6 | 57.2 |
|  | Heat conductivity (W/mK) | 0.39 | 0.41 | 0.45 |
|  | Bending strength (kg/cm$^2$) | 910 | 1050 | 1170 |

According to the process of the present invention, a hollow spheres-containing thermoplastic resin composition of low specific gravity can be manufactured by a melt processing extrusion method.

What is claimed is:

1. A process for producing a thermoplastic resin composition, wherein a melt-kneading extruder equipped with a screw is used and the extruder has an upper stream side supplying portion at the upper stream part of the extrusion direction, and a lower stream side supplying portion at the lower stream part from said upper stream side supplying portion, and the ratio (L/D) of the distance (L) between said upper stream side supplying portion and said lower stream side supplying portion to the diameter (D) of a screw is 4–30 (L and D are the same scale units); and under screw rotation, a thermoplastic resin having a specific gravity of 1.10 or more is supplied from the upper stream side supplying portion, and hollow spheres in an amount of 2–50 parts by weight based on 100 parts by weight of the thermoplastic resin are supplied from the lower stream side supplying portion.

2. A process for producing a thermoplastic resin composition according to claim 1, wherein inorganic fibers in an amount of 1–40 parts by weight based on 100 parts by weight of the thermoplastic resin are further supplied from the upper stream side supplying portion and/or the lower stream side supplying portion.

3. A process for producing a thermoplastic resin composition according to claim 1 or 2, wherein the screw portion at lower stream from the lower stream side supplying portion of a melt-kneading extruder substantially consists of only a thread screw of forward direction to the extrusion direction, and does not have a kneading section.

4. A process for producing a thermoplastic resin composition according to claim 1 or 2, wherein the hollow spheres have a mean particle diameter of 5–500 μm, and a volume hollowness of 60–80%.

5. A process for producing a thermoplastic resin composition according to claim 1 or 2, wherein the thermoplastic resin is a liquid crystal polyester resin.

6. A process for producing a thermoplastic resin composition according to claim 5, wherein the flow temperature of the liquid crystal polyester resin defined below is 250° C. or more, wherein the flow temperature is defined as a temperature at which the melt viscosity shows 48000 poise when a heated resin is extruded, using a capillary tube rheometer, through a nozzle have an inner diameter of 1 mm and a length of 10 mm under a load of 9.81 Mpa at a temperature-rising rate of 4° C./minute.

7. A process for producing a thermoplastic resin composition according to claim 5, wherein the liquid crystal polyester resin has 30% by mole or more of the following structural unit ($A_1$)

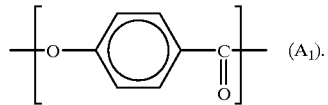

* * * * *